United States Patent
McClintock et al.

(10) Patent No.: US 7,617,341 B2
(45) Date of Patent: Nov. 10, 2009

(54) METHOD AND SYSTEM FOR SWITCHING A DVI DISPLAY HOST

(75) Inventors: David L. McClintock, Austin, TX (US); Todd W. Schlottman, Round Rock, TX (US)

(73) Assignee: Dell Products L.P., Round Rock, TX (US)

(*) Notice: Subject to any disclaimer, the term of this patent is extended or adjusted under 35 U.S.C. 154(b) by 1515 days.

(21) Appl. No.: 10/704,844

(22) Filed: Nov. 10, 2003

(65) Prior Publication Data
US 2005/0171623 A1    Aug. 4, 2005

(51) Int. Cl.
G06F 3/00 (2006.01)
G06F 13/12 (2006.01)
H05K 7/10 (2006.01)

(52) U.S. Cl. .............. 710/73; 710/15; 710/16; 710/17; 710/18; 710/302

(58) Field of Classification Search .............. None
See application file for complete search history.

(56) References Cited

U.S. PATENT DOCUMENTS

| | | | |
|---|---|---|---|
| 6,528,904 B1 | 3/2003 | Wong | 307/140 |
| 6,609,034 B1 | 8/2003 | Behrens et al. | 700/19 |
| 6,615,272 B1 | 9/2003 | Ambrose | 709/238 |
| 2004/0199699 A1* | 10/2004 | Bobbitt et al. | 710/305 |

OTHER PUBLICATIONS

Digital Display Working Group Promoters "Digital Visual Interface DVI" Revision 1.0, Apr. 2, 1999.

* cited by examiner

*Primary Examiner*—Alan Chen
(74) *Attorney, Agent, or Firm*—Hamilton & Terrile, LLP; Robert W. Holland

(57) ABSTRACT

Plural information handling systems interface through a KVM switch with a DVI display with the KVM switch supporting selection of the information handling system providing display information to the display. A hotswap switch initiates a hotswap signal to the information handling system that is selected to provide display information to the display. Receipt of the hotswap signal at the information handling system results in the driver of the selected information handling system redetecting the display with a communication through the DDC channel and transfer of EDID information from the display to the selected information handling system so that the selected information handling system drives a desired display port, such as by sending display information through a TDMS channel instead of default VGA channel.

21 Claims, 2 Drawing Sheets

METHOD AND SYSTEM FOR SWITCHING A DVI DISPLAY HOST

BACKGROUND OF THE INVENTION

1. Field of the Invention

The present invention relates in general to the field of information handling system displays, and more particularly to a method and system for switching a DDC display host.

2. Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling system users typically interact with information handling systems through input and output devices, such as a display, keyboard and mouse. However, in some instances, user interaction with an information handling system is rare, such as during testing of systems or with servers that process network information. For example, a test rack typically supports operation of plural information handling systems that repeatedly run test operations to determine system failure rates with the system operations monitored by a common keyboard, mouse and display. As another example, a blade server supports plural blade information handling systems that process network information with a blade server having a common keyboard, mouse and display that selectively interface a user with each blade. Typically, a common keyboard, mouse and display interface with plural information handling systems through a KVM (keyboard video mouse) switch. A user selects the information handling system to interface with the keyboard, mouse and display and the KVM switch interfaces the signals so that the selected information handling system communicates with the keyboard, mouse and display.

KVM switches are effective at cycling video signals in a VGA format between different host information handling systems but have difficulty cycling video signals in a Digital Visual Interface (DVI) format. The DVI-I standard transfers video information as a serial signal to the display sent through a TDMS channel. The information handling system determines the type of display and other configuration information with EDID information sent from the display through a relatively slow speed DDC channel. If EDID information is unavailable, the host information handling system will typically default to the communication of video information in the VGA format by driving a VGA port instead of the DVI port. Since the KVM switch does not maintain a continuous DDC channel from a selected host information handling system to the display as the host selection changes, a new host selection by the KVM switch often provides a VGA signal instead of a DVI signal, or no signal at all. For instance, the DDC interface provides too slow of an exchange of EDID information so that cycling between host information handling systems results in an unselected host attempting to read EDID information. Since the returned information is invalid, the host information handling system may switch to a unconnected display port which results in no video display to the user. To return the display, the correct EDID information must then typically be read at POST, driver load and hardware redetect in order for the DVI display to be properly driven.

SUMMARY OF THE INVENTION

Therefore a need has arisen for a method and system which switches a DVI display host information handling system to allow cycling of a single DVI display through plural host information handling systems.

In accordance with the present invention, a method and system are provided which substantially reduce the disadvantages and problems associated with previous methods and systems for switching a DVI display host information handling system. A simulated hotswap signal associated with the switch induces the newly selected information handling system host to redetect the display. Redetection of the display by the selected information handling system provides communication of EDID information through the DDC channel of the DVI interface to aid proper configuration of the information handling system to output a TDMS signal to the DVI display.

More specifically, a hotswap module associated with a KVM switch provides a simulated hotswap signal to an information handling system selected by the KVM switch that induces the information handling system to redetect the display interfaced with the KVM switch. Redetection of a display due to a transition of the hotswap signal results in a transfer of EDID information to the selected information handling system from the display through the DDC channel to ensure that the selected information handling system is properly configured to communicate a DVI signal to the display. The simulated hotswap signal is sent manually by activation of a switch associated with the KVM switch so that a user may initiate redetection of the display if the display fails to present information or presents information in a VGA format. Alternatively, the simulated hotswap signal issues automatically if the KVM selects a new information handling system to display information.

The present invention provides a number of important technical advantages. One example of an important technical advantage is that a DVI display cycles through plural host information handling systems with the host information handling systems providing a DVI display signal to the display without requiring a new POST, driver load or hardware redetect. The use of a simulated hotswap signal to induce redetection of the display complies with the DVI-I standard with minimal intrusion in operation of information handling systems or displays and is thus suitable for test situations as well as deployed server information handling systems.

BRIEF DESCRIPTION OF THE DRAWINGS

The present invention may be better understood, and its numerous objects, features and advantages made apparent to those skilled in the art by referencing the accompanying

DETAILED DESCRIPTION

A KVM switch aids communication of a DVI display signal from a selected information handling system to a DVI display by using a hotswap signal that directs the selected information handling system to redetect the DVI display through an exchange of EDID information over the DVI DDC channel. For purposes of this application, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating With external devices as well as various input and output (I/O) devices, such as a keyboard, a mouse, and a video display. The information handling system may also include one or more buses operable to transmit communications between the various hardware components.

Figure 1:
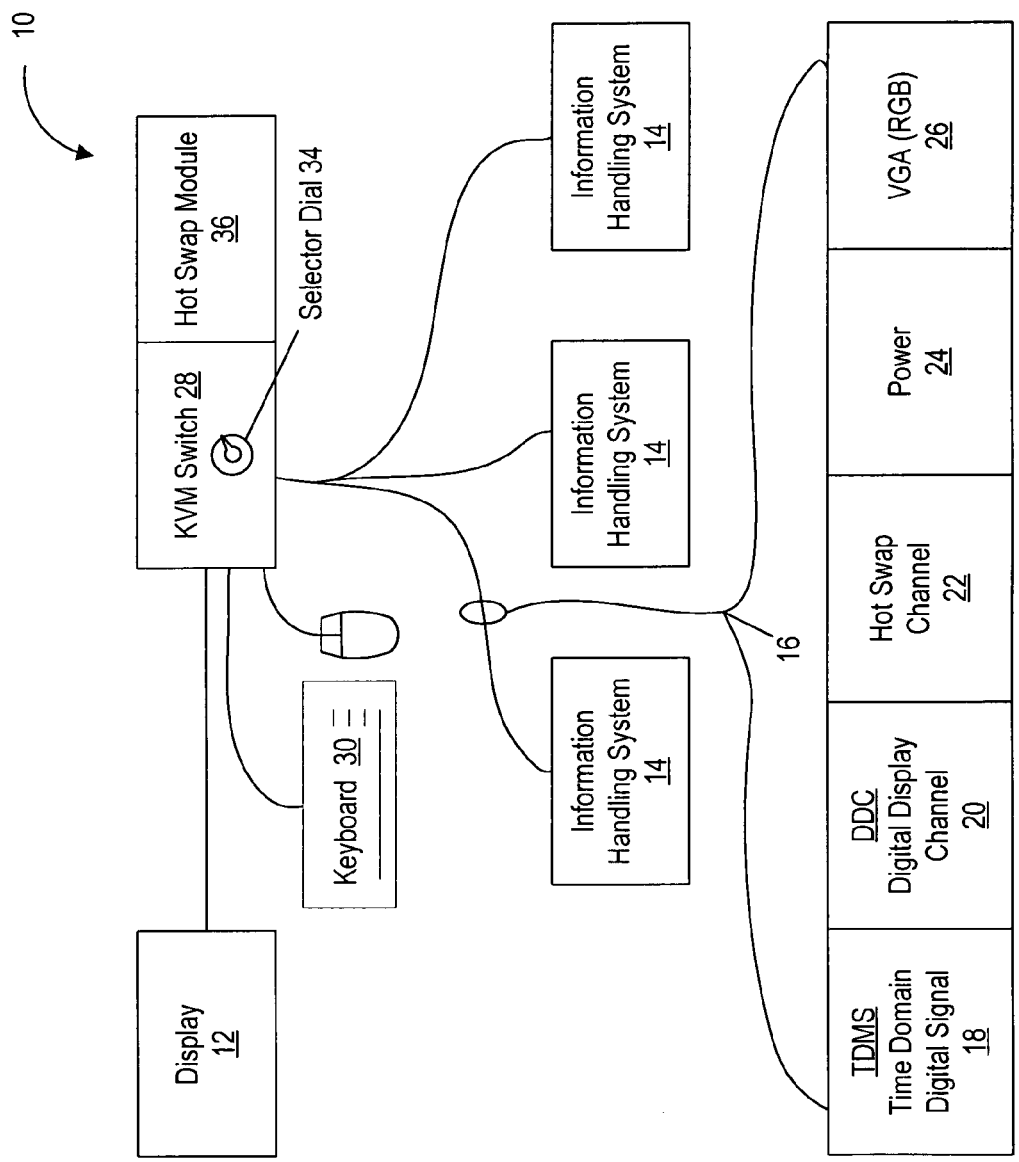
FIG. 1 depicts a block diagram of a system for switching a DVI display host.

Referring now to FIG. 1, a block diagram depicts a system 10 for switching display information received by a DVI display 12 from between plural information handling system hosts 14. As depicted by box 16, a DVI-I display signal includes five separate elements. The time domain digital signal (TDMS) channel 18 communicates serial video information from an information handling system 14 to display 12. The digital display channel (DDC) channel provides a lower speed bi-directional channel to exchange configuration information, such as communicating the type of monitor to an information handling system. The hotswap channel 22 remains a high signal while a monitor is coupled to an information handling system interface and goes to low signal if a monitor is removed. A transition of the hot swap signal from high to low to high informs an information handling system that a DVI display was "hotswapped" and thus allows the video driver of the information handling system to redetect the display through DDC channel 20 to obtain the newly coupled display's EDID information. Power channel 24 provides power from the information handling system to the display and VGA channel 26 provides a conventional RGB VGA signal of the display information. VGA channel 26 acts as a default for the information handling system to display information if the type of monitor interfaced with the information handling system is in doubt.

A KVM switch 28 interfaces with information handling systems 14, display 12, a keyboard 30 and a mouse 32 to allow selective communication between the keyboard, mouse and display and a selected one of information handling systems 14. For instance, a selector dial 34 has plural positions with each information handling system 14 represented by a position. When an information handling system 14 is selected, keyboard 30 and mouse 32 user input signals interface through KVM switch 28 to that selected information handling system and display information signals interface from that selected information handling system through KVM switch 28 to display 12. A hotswap module 36 associated with KVM switch 28 interfaces with information handling systems 14 to simulate a display hotswap by transitioning the signal on hotswap channel 22 to imitate removal and recoupling of a display to the information handling system 14 selected by selector dial 34. The transition of the hotswap signal directs the selected information handling system 14 that receives the hotswap signal to redetect display 12 by requesting display EDID information through DDC channel 20. Thus, activation of hotswap module 36 allows the selected information handling system 12 to determine the type of interfaced display 12 for proper communication of the DVI signal to the display.

Hotswap module 36 allows manual or automatic communication of a hotswap signal to a selected information handling system as a convenient way of inducing an information handling system request for EDID information from a DVI display. In one embodiment, hotswap module 36 is a physical switch that a user may manually activates if display 12 fails to display video or displays a VGA instead of TDMS video signal. Upon manual activation, a simulated hotswap signal is communicated to the selected information handling system 14 for an attempt to redetect display 12 and setup communication of DVI video information. Alternatively, hotswap module 36 may be implemented as a software module that simulates a hotswap signal if a predetermined input is received from keyboard 30 or mouse 32. In another software embodiment, hot swap module 36 automatically sends a hotswap signal upon activation of selector dial 34 so that a monitor redetect is performed for each newly selected information handling system 14. Hotswap module 36 helps to ensure properly formatted display information is provided from a selected information handling system in a number of different configurations, including during testing of plural information handling systems and for server configurations in which display use is minimal, such as with blade servers that associate plural blade information handling systems.

Figure 2:
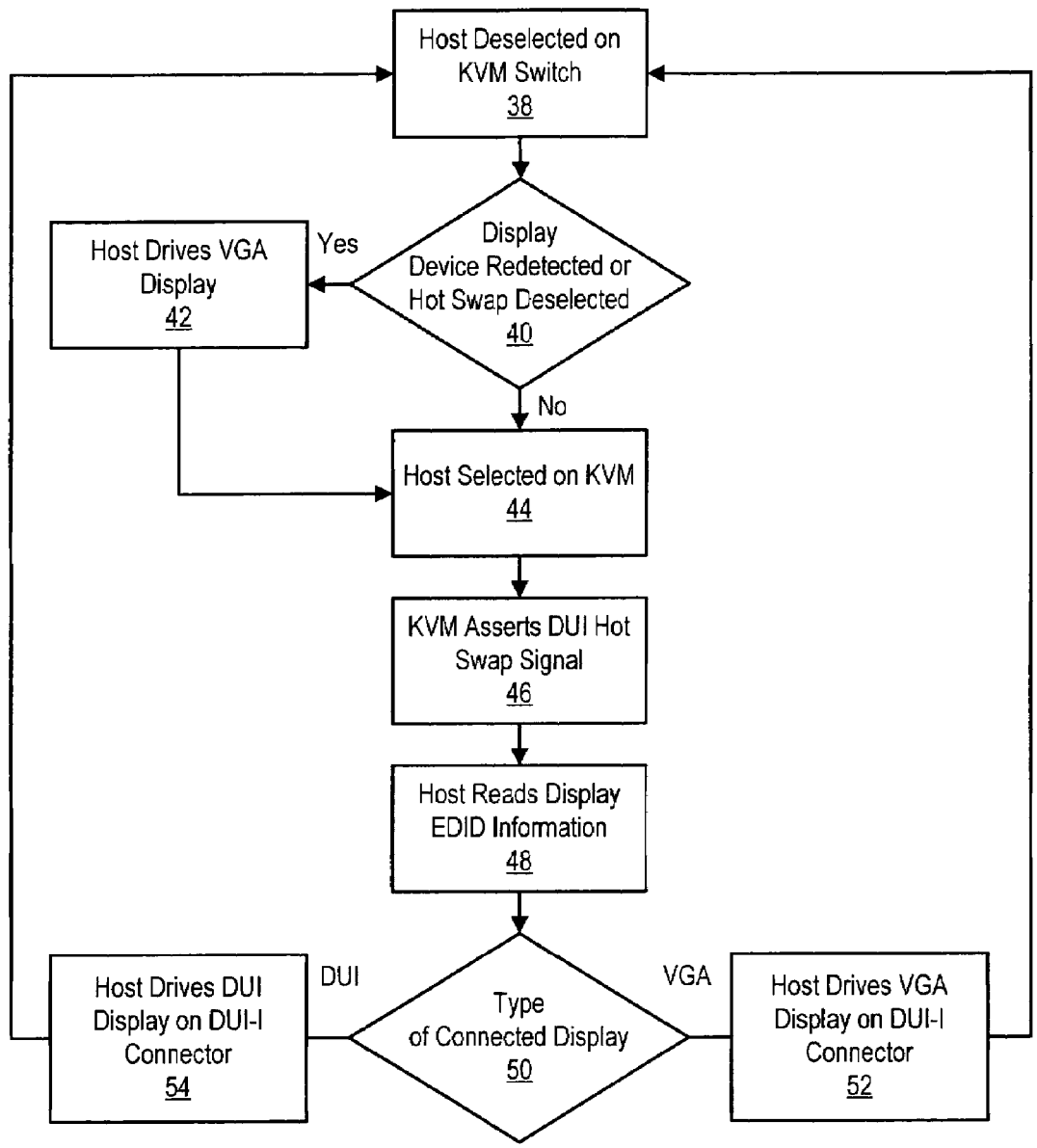
FIG. 2 depicts a flow diagram of a method for switching a DVI display host.

Referring now to FIG. 2, a flow diagram depicts a method for switching a DVI display information handling system host. The process begins at step 38 with deselection of an interfaced information handling system by a KVM switch. At step 40, a determination is made by the host information handling system of whether the display device is redetected or the hotswap signal is deasserted indicating a decoupling of the host information handling system with the display. If the display is redetected then the process continues to step 42 at which the host information handling system drives the display information as a default VGA formatted signal. The process continues to step 44 at which a new host information handling system is selected. Initially upon selection of the new host information handling system, a VGA formatted display signal or not display signal at all is provided to the display. At step 46, the KVM switch asserts a DVI hotswap signal to the new host information handling system resulting in an attempt by the new information handling system to redetect the display. At step 48, the new information handling system host reads the display EDID information and, at step 50, determines the type of connected display. If the determination is that the display is a VGA display, the selected host information handling system drives the display with VGA formatted information at step 52. If the determination is that the display is a DVI display, the selected host information handling system drives the display with DVI formatted information at step 54. The process returns to step 38 and repeats if the selected host information handling system is subsequently deselected.

Although the present invention has been described in detail, it should be understood that various changes, substitutions and alterations can be made hereto without departing from the spirit and scope of the invention as defined by the appended claims.

What is claimed is:

1. A system for display of information from a selected of plural information handling systems, the system comprising:
    plural information handling systems each operable to output display information;
    a display operable to present the display information;
    a switch interfacing the plural information handling systems and the display, the switch operable to selectively interface one of the plural information handling systems to output display information to the display; and
    a hotswap module interfaced with the plural information handling systems and operable to trigger the selected one of the plural information handling systems to detect the display by sending a hotswap signal to the selected one of the plural information handling systems.

2. The system of claim 1 wherein the switch comprises a KVM switch.

3. The system of claim 2 wherein the information handling systems comprise test systems.

4. The system of claim 1 wherein the information handling systems comprise server blades disposed in a blade server.

5. The system of claim 1 wherein the display information comprises DVI formatted information having TDMS and DDC channels, and wherein the hotswap module triggers transfer of display EDID information to the selected information handling system through the DDC channel.

6. The system of claim 5 wherein the display information further comprises VGA formatted information, the selected information handling system providing display information with the VGA format as the default format, the hotswap module trigger switching the display information from the VGA format to the DVI format.

7. The system of claim 1 wherein the hotswap module comprises a physical switch operable to accept a manual input.

8. A method for selective display of information from one of plural information handling systems, the method comprising:
    communicating display information from a first information handling system to a display;
    deselecting communication of the display information from the first information handling system;
    selecting communication of display information from a second information handling system to the display;
    asserting a hotswap signal to the second information handling system; and
    detecting the display from the second information handling system in response to the hotswap signal.

9. The method of claim 8 wherein deselecting and selecting communication of display information comprises manual selection of a switch interfacing the information handling systems with the display.

10. The method of claim 9 wherein the switch comprises a KVM switch.

11. The method of claim 10 wherein asserting a hotswap signal further comprises:
    manual selection of a hotswap module at the KVM switch.

12. The method of claim 8 wherein selecting communication of display information from a second information handling system to the display further comprises:
    communicating VGA formatted information from the second information handling system to the display;
    receiving the hotswap signal at the second information handling system;
    redetecting the display with a driver of the second information handling system; and
    communicating DVI formatted information from the second information handling system to the display.

13. The method of claim 12 wherein redetecting the display further comprises receiving EDID information from the display through a DDC channel in response to the hotswap signal.

14. The method of claim 8 wherein the information handling systems comprise servers.

15. The method of claim 14 wherein the servers comprise blades of a blade server.

16. A switch for selecting one of plural information handling systems to communicate information to a DVI display, the switch comprising:
    an information handling system interface operable to communicate display signals with plural information handling systems;
    a display interface operable to communicate display signals with DVI display;
    an information handling system selector operable to select one of plural information handling systems to communicate information through the information handling system interface to the display interface; and
    a hotswap module operable to assert a hotswap signal from the switch to the selected information handling system, the hotswap signal operable to direct the selected information handling system to redetect the DVI display.

17. The switch of claim 16 wherein the hotswap module comprise a switch operable to send the hotswap signal upon manual activation.

18. The switch of claim 16 further comprising:
    a keyboard interface operable to communicate signals with a keyboard; and
    a mouse interface operable to communicate signals with a mouse;
    wherein the information handling selector is further operable to select one of plural information handling systems to communicate information through the information handling system interface to the keyboard and mouse interface.

19. The switch of claim 18 wherein the hotswap module comprises a software module operable to send the hotswap signal upon receiving a predetermined keyboard input.

20. The switch of claim 18 wherein the hotswap module comprises a software module operable to send the hotswap signal upon receiving a predetermined mouse input.

21. The switch of claim 18 wherein the hotswap module is further operable to automatically send the hotswap signal upon activation of the information handling system selector.

* * * * *

UNITED STATES PATENT AND TRADEMARK OFFICE
CERTIFICATE OF CORRECTION

| | | |
|---|---|---|
| PATENT NO. | : 7,617,341 B2 | Page 1 of 1 |
| APPLICATION NO. | : 10/704844 | |
| DATED | : November 10, 2009 | |
| INVENTOR(S) | : McClintock et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1765 days.

Signed and Sealed this

Nineteenth Day of October, 2010

David J. Kappos
*Director of the United States Patent and Trademark Office*